(12) United States Patent
Choi

(10) Patent No.: US 9,921,464 B1
(45) Date of Patent: Mar. 20, 2018

(54) GIMBAL FOR 360-DEGREE VIDEO AND PICTURE SHOOTING

(71) Applicant: Seung Kwon Choi, Namyangju-si (KR)

(72) Inventor: Seung Kwon Choi, Namyangju-si (KR)

( * ) Notice: Subject to any disclaimer, the term of this patent is extended or adjusted under 35 U.S.C. 154(b) by 0 days.

(21) Appl. No.: 15/585,527

(22) Filed: May 3, 2017

(51) Int. Cl.
| | |
|---|---|
| G03B 37/00 | (2006.01) |
| G02B 27/64 | (2006.01) |
| G03B 17/56 | (2006.01) |
| H04N 5/232 | (2006.01) |
| H04N 5/247 | (2006.01) |
| H04N 13/02 | (2006.01) |
| F16M 13/02 | (2006.01) |

(52) U.S. Cl.
CPC ............. *G03B 37/00* (2013.01); *G02B 27/64* (2013.01); *G03B 17/561* (2013.01); *F16M 13/02* (2013.01); *H04N 5/247* (2013.01); *H04N 13/0242* (2013.01)

(58) Field of Classification Search
None
See application file for complete search history.

(56) References Cited

U.S. PATENT DOCUMENTS

| | | | | | |
|---|---|---|---|---|---|
| 2,942,516 | A | * | 6/1960 | Disney | G03B 37/04 352/70 |
| 4,864,335 | A | * | 9/1989 | Corrales | G03B 37/02 352/69 |
| 5,023,725 | A | * | 6/1991 | McCutchen | G03B 37/04 348/264 |
| 9,575,394 | B1 | * | 2/2017 | Wallace | H04N 5/2252 |
| 9,800,786 | B1 | * | 10/2017 | Wei | G03B 17/568 |
| 2004/0246333 | A1 | * | 12/2004 | Steuart, III | G03B 35/08 348/36 |
| 2011/0249100 | A1 | * | 10/2011 | Jayaram | H04N 5/2253 348/48 |
| 2012/0217356 | A1 | * | 8/2012 | Park | G08B 13/19619 248/122.1 |
| 2014/0160274 | A1 | * | 6/2014 | Ishida | G01S 19/14 348/113 |
| 2015/0116453 | A1 | * | 4/2015 | Hirata | H04N 5/23245 348/38 |
| 2016/0139061 | A1 | * | 5/2016 | Kesselberg | G03B 15/03 348/37 |
| 2016/0349600 | A1 | * | 12/2016 | Macmillan | G03B 37/04 |
| 2016/0352982 | A1 | * | 12/2016 | Weaver | H04N 5/23238 |
| 2017/0299949 | A1 | * | 10/2017 | Donaldson | G03B 17/02 |

FOREIGN PATENT DOCUMENTS

| | | |
|---|---|---|
| KR | 10-2011-0111277 A | 10/2011 |
| KR | 10-2015-0141352 A | 12/2015 |

* cited by examiner

*Primary Examiner* — W B Perkey
(74) *Attorney, Agent, or Firm* — Novick, Kim & Lee, PLLC; Jae Youn Kim

(57) ABSTRACT

Provided is a gimbal for 360-degree video and picture shooting including: a camera mounting unit having a body and a cavity formed in a center of the body, with a plurality of cameras being mounted on an outer peripheral surface of the body to take a 360-degree image or picture; a multi-axis driving unit provided in the cavity of the camera mounting unit and fixed to one side of the camera mounting unit to calibrate shaking of the camera mounting unit; and a support unit to which the other side of the multi-axis driving unit is fixed. Since the multi-axis driving unit is not exposed to the outside when the gimbal takes the 360-degree image and picture, it is possible to minimize the restriction of the area to be filmed when taking the surrounding image and picture.

1 Claim, 9 Drawing Sheets

GIMBAL FOR 360-DEGREE VIDEO AND PICTURE SHOOTING

BACKGROUND OF THE INVENTION

Field of the Invention

The present invention relates to a 360-degree motion gimbal, and, more specifically, to a gimbal for 360-degree video and picture shooting that can calibrate roll, pitch and yaw of a 360-degree camera so as to consistently maintain an orientation of cameras taking a 360-degree image and picture.

Background of the Related Art

In recent, virtual reality technologies are applied to various applications, such as Web 3D, simulation, game, design, education, medical training, military and the like. Among the virtual reality technologies, panoramic virtual reality is a technology of composing a series of individual images captured by a camera into an interactive 360 view. Specifically, a series of images captured by horizontally or vertically rotating the camera in all directions are stitched with a dedicated panorama stitching software, and then are overlaid on a sphere or cylinder. After that, a viewer can see the image by rotating, zooming or shifting it around a nodal point by use of a mouse.

Since the panoramic virtual reality technology has some advantages of easy work, low costs and a short-term product, it is quickly introduced relative to other VR technologies, and thus is applied to various applications, such as relics, tourism, architecture, model house, interior, travel, shopping mall, real estate and the like.

In particular, in music videos, drams or moves using the panoramic virtual reality technology, the appearance or image beauty is changed depending upon a shooting angle. If the surrounding background and actors are filmed at various angles so as to properly balance between them, it is possible to maximize the liveliness of the image.

In the case where the actor is filmed at an angle from top to bottom, it is usually filmed by use of a camera suspended from a long rod. There are problems of limited length and limited operation.

In order to solve the above problems, a new shooting method is proposed and widely used in which an imaging device, such as a camera or a camcorder, is installed to a structure, such as a crane, or a mobile means, such as a helicopter, and is controlled by a remote controller on the ground.

A mounting member, such as a gimbal, is required to install the imaging device, such as a camera, to the structure or the mobile means.

A conventional camera gimbal is generally configured to mount a camera on a stand and install the stand to the structure or the mobile means by a support. In the case of some camera gimbals, the stand mounted with the camera and/or the support is able to pivotally move so as to control multi-directional rotation of the camera.

Such a camera gimbal is referred to as a stabilizer which consistently maintains an orientation of the camera by detecting roll, pitch and yaw of the camera. Some examples are disclosed in Korean Laid-Open Publication Nos. 10-2011-0111277 and 10-2015-0141352.

According to the camera gimbals disclosed in the above publications, the structure of a shaft for pivoting the camera in all directions is complicated, and the shaft is exposed to the camera, so that the area to be filmed is limited since the structure of a camera supporting frame or a motor can be captured together with a scene.

In addition, the above structure has another problem in that it is limited to capture a 360-degree panoramic image.

SUMMARY OF THE INVENTION

Therefore, the present invention has been made in view of the above problems, and an object of the present invention is to provide a gimbal for 360-degree video and picture shooting including a multi-axis driving unit to stably maintain levels of cameras mounted to an inside of a camera mounting unit at regular intervals to take an 360-degree panoramic image and picture, thereby minimizing a shaking calibrating structure from being exposed to an outside.

Another object of the present invention is to provide a gimbal for 360-degree video and picture shooting having a compact structure which can be easily carried and can be easily mounted to a drone or vehicle.

In order to achieve the above objects, there is provided a gimbal for 360-degree video and picture shooting including: a camera mounting unit having a body and a cavity formed in a center of the body, with a plurality of cameras being mounted on an outer peripheral surface of the body to take a 360-degree image or picture; a multi-axis driving unit provided in the cavity of the camera mounting unit and fixed to one side of the camera mounting unit to calibrate shaking of the camera mounting unit; and a support unit to which the other side of the multi-axis driving unit is fixed, wherein the body of the camera mounting unit is formed in a cylindrical or polygonal shape, with top and bottom portions being opened or a portion being opened, and is provided on an outer peripheral surface thereof with a plurality of fixing grooves at regular intervals, with which the cameras are brought into close contact to take 360-degree panoramic image or picture, and a plurality of fixing holes are formed in the fixing grooves to mount the cameras; a coupling portion is extended from one side of the body to the cavity, and a fixing member protrudes integrally from the coupling portion and is connected to one side of the multi-axis driving unit; the coupling portion is formed on a top surface thereof with a fixing hole to which an auxiliary bracket is detachably mounted, and the camera is mounted to the auxiliary bracket; the multi-axis driving unit includes a Z-axis motor fixed to one end of the support unit in a Z-axis direction, a Z-axis bracket with one end engaged to a rotary shaft of the Z-axis motor and the other end protruding in the Z-axis direction, an Y-axis motor fixed to the other end of the Z-axis bracket in an Y-axis direction, an Y-axis bracket with one end engaged to a rotary shaft of the Y-axis motor and the other end protruding in the Y-axis direction, an X-axis motor fixed to the other end of the Y-axis bracket in an X-axis direction, and an X-axis bracket with one end engaged to a rotary shaft of the X-axis motor and the other end protruding in the X-axis direction and integrally fixed to the camera mounting unit; the X-axis bracket has a fixing plate engaged to a front end of the rotary shaft and a coupling shaft protruding from a front portion of the fixing plate and formed with a slot, through which the fixing member of the camera mounting unit is inserted; the fixing member is inserted in the slot, and a fastening member is fastened to the fixing member; and the support unit is provided with a battery to supply a power, and a control substrate to control the X-axis, Y-axis and Z-axis motors.

With the above configuration of the gimbal for 360-degree video and picture shooting according to the present invention, since the multi-axis driving unit to calibrate the shaking of the cameras when taking the 360-degree image and picture is not exposed to the outside, it is possible to minimize the limitation of an area to be filmed when taking the surrounding image and picture, and to capture a clean image and picture with no undesirable motions.

In addition, it is possible to drive a heavy camera using a large gimbal motor. Since the multi-axis driving unit can be operated in a 2-axis or 3-axis driving manner, the gimbal can be downsized or lightened through the simplified structure, it can be applied to various applications, such as a helmet or a drone.

DETAILED DESCRIPTION OF THE PREFERRED EMBODIMENT

Figure 1A:
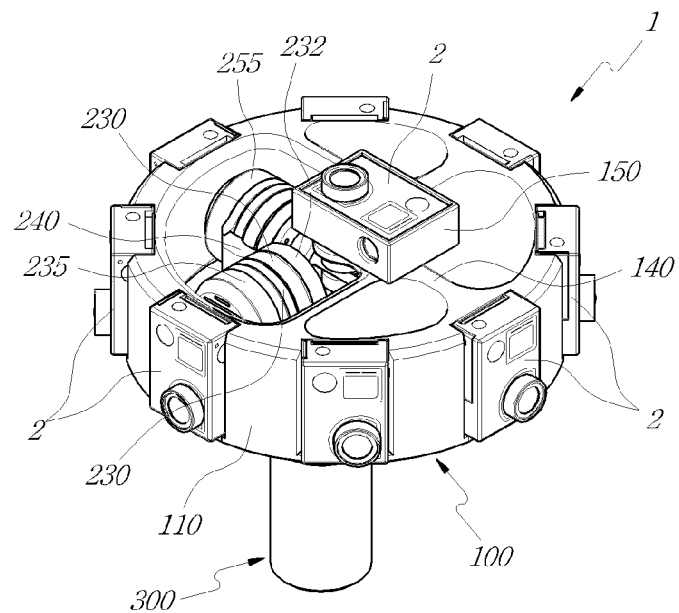
FIGS. 1A and 1B are top and bottom perspective views illustrating a gimbal for 360-degree video and picture shooting according to one embodiment of the present invention.
Figure 1B:
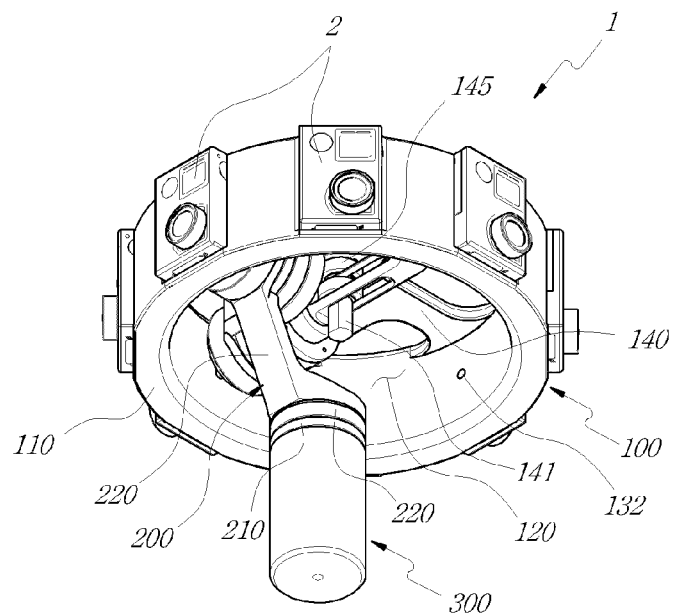
Figure 2:
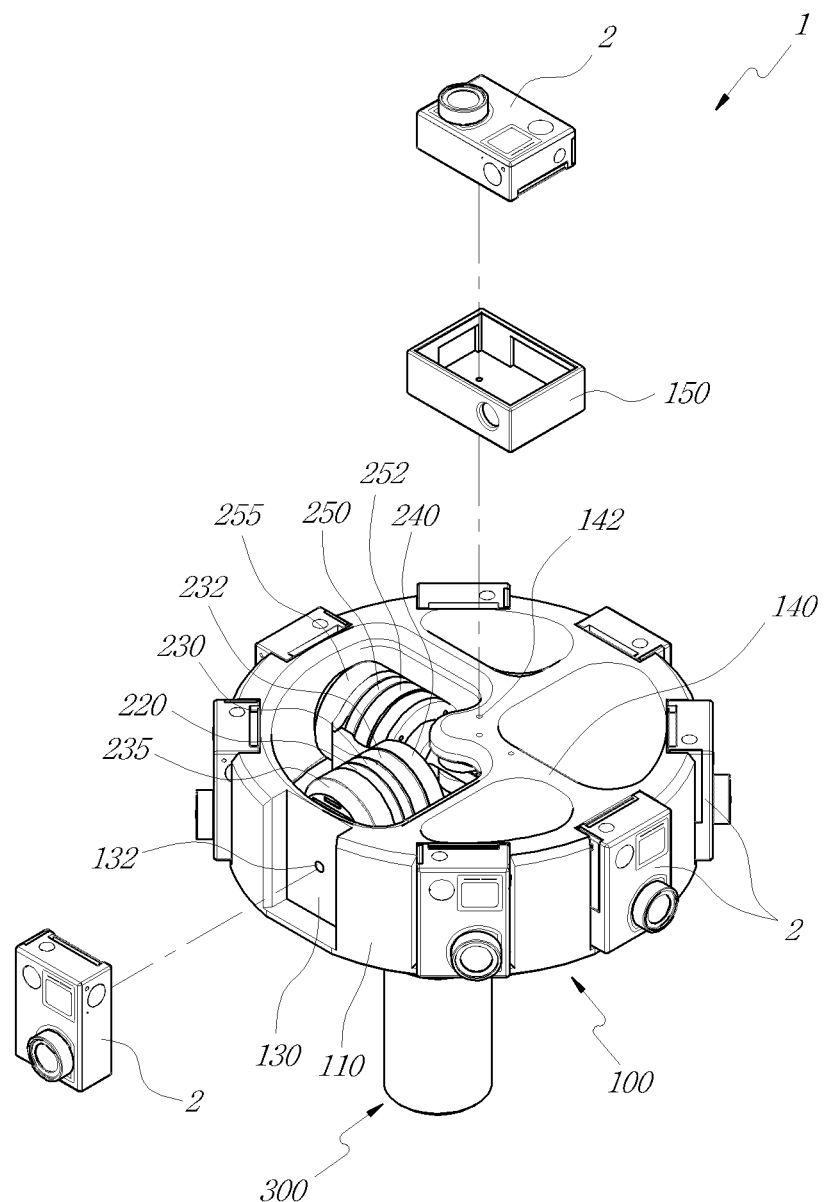
FIG. 2 is a perspective view illustrating a state in which a camera is installed to the gimbal for 360-degree video and picture shooting according to the present invention.
Figure 3:
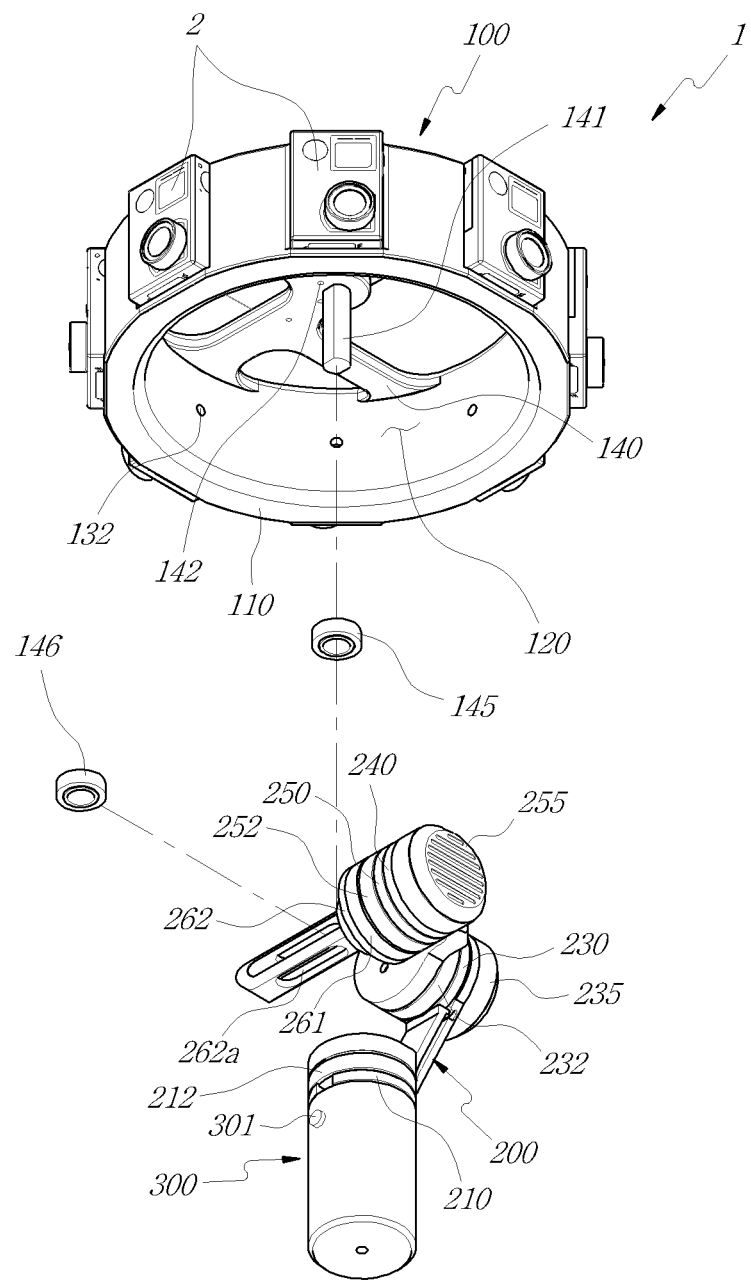
FIG. 3 is an exploded perspective view of a camera mounting unit and a multi-axis driving unit according to the present invention.
Figure 4:
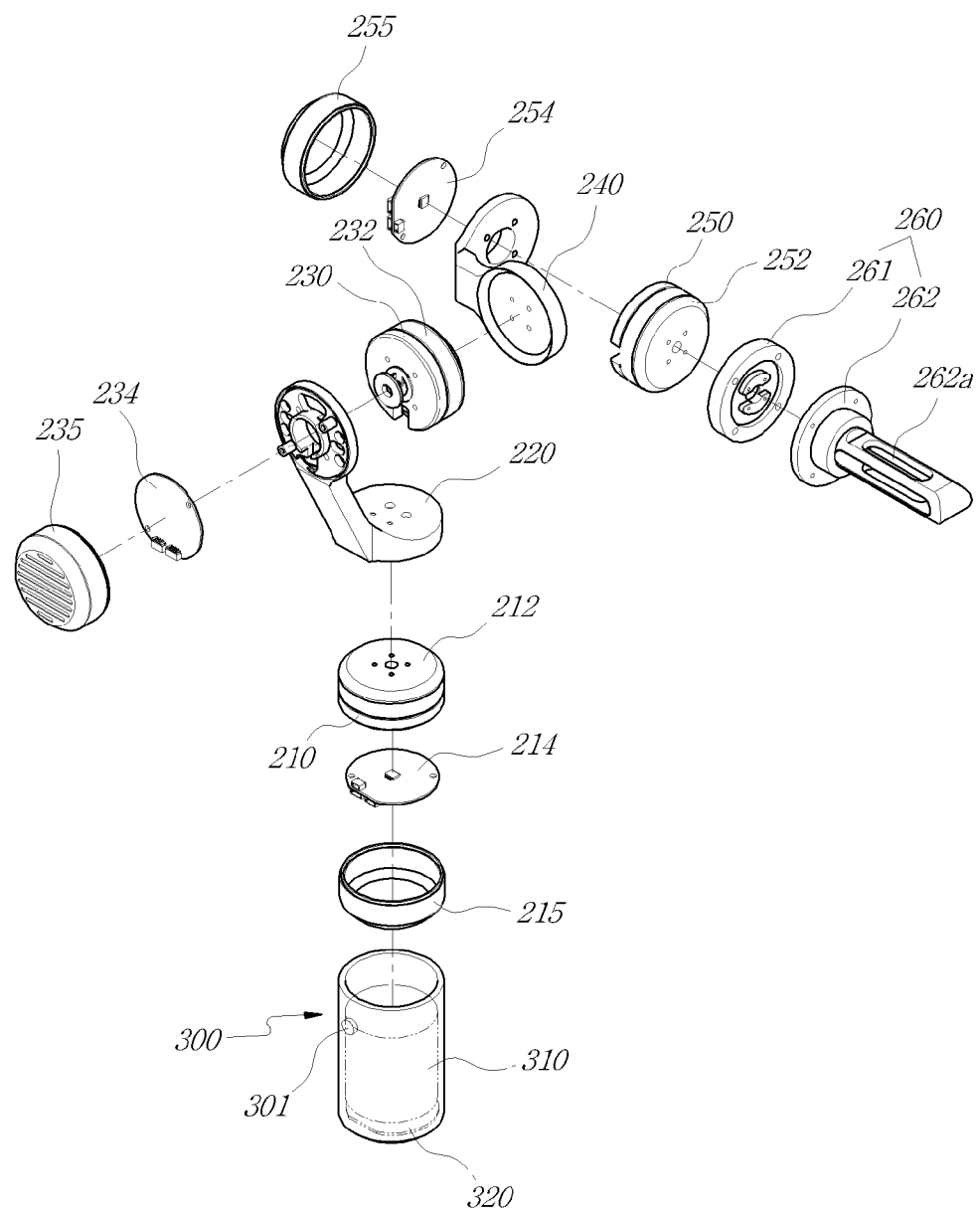
FIG. 4 is an exploded perspective view of the multi-axis driving unit according to the present invention.
Figure 5:
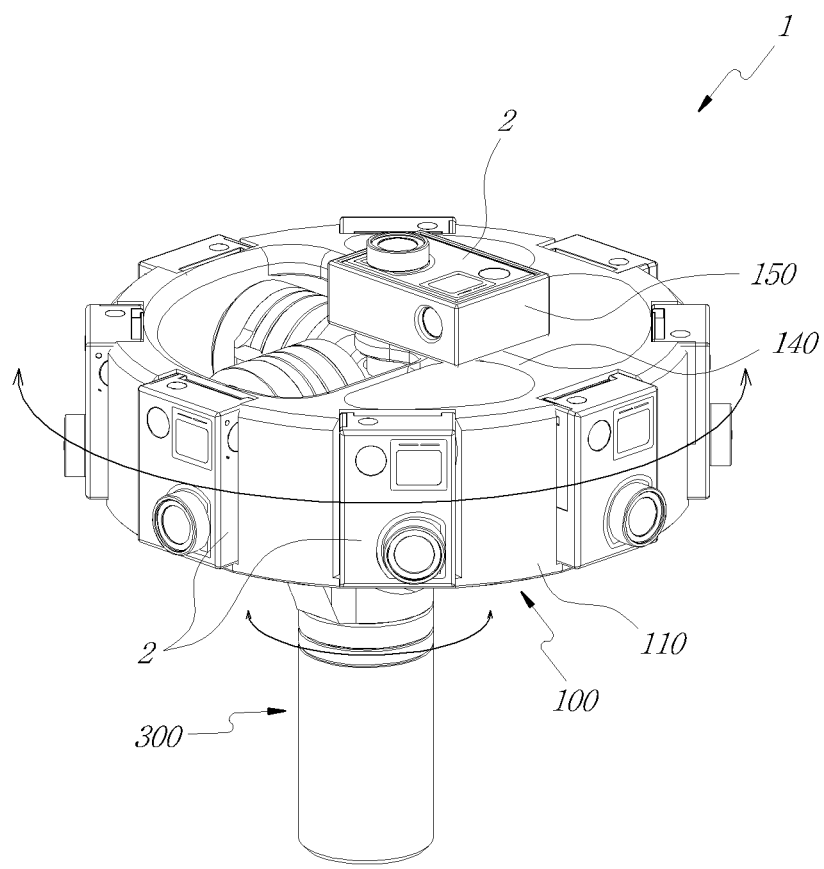
FIGS. 5 to 7 are perspective views illustrating Z-axis, Y-axis and X-axis driving states of the multi-axis driving unit.
Figure 6:
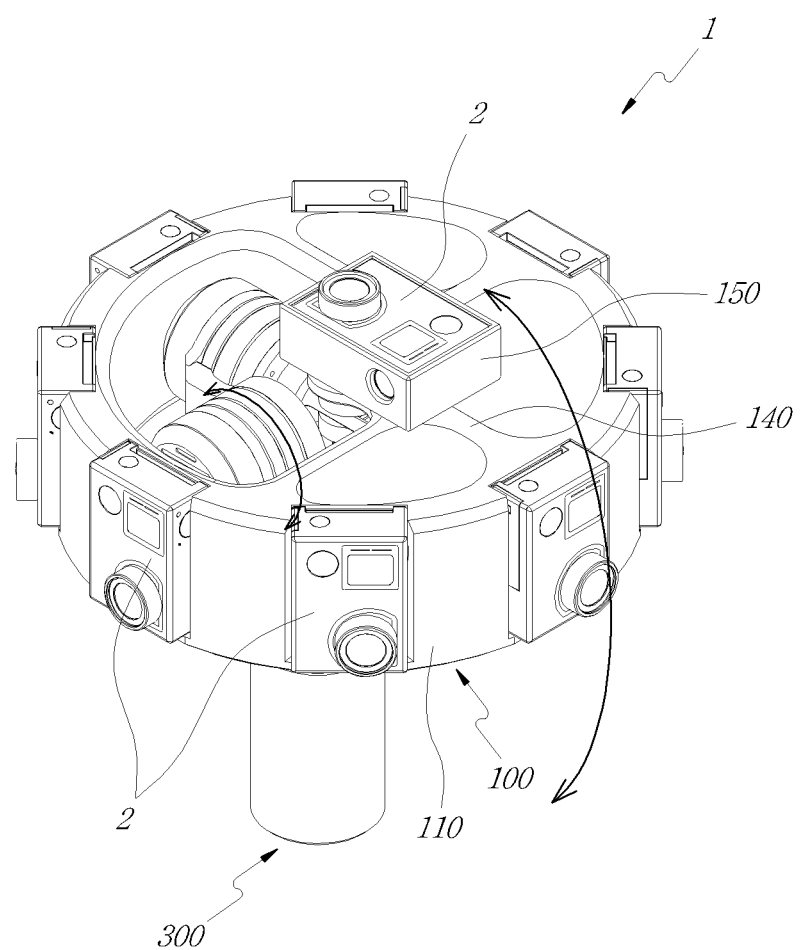
Figure 7:
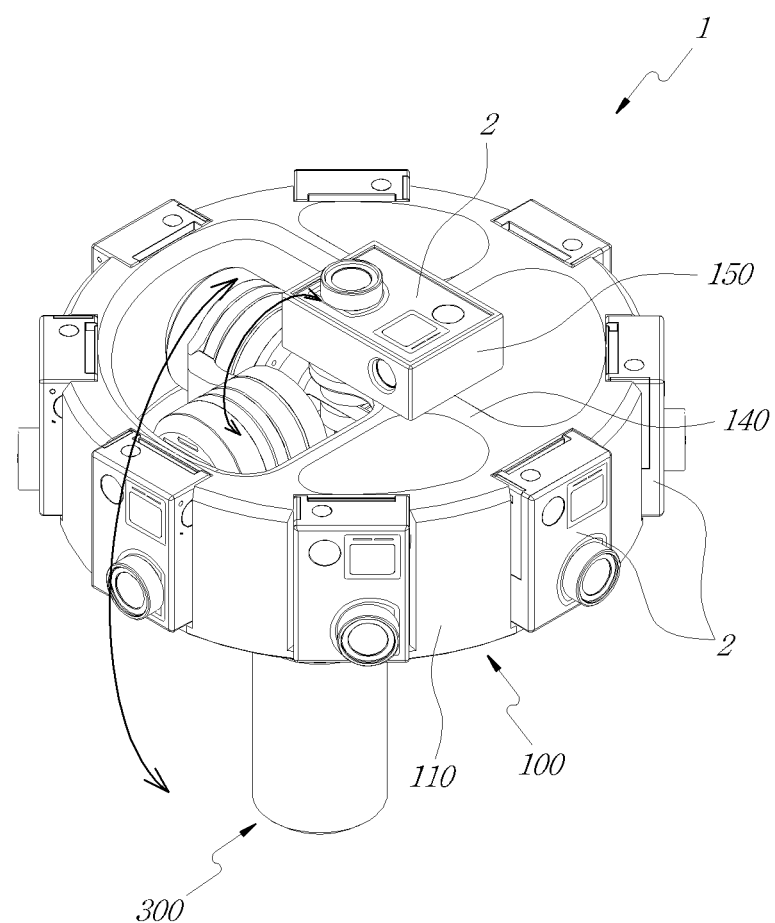

A gimbal for 360-degree video and picture shooting according to the present invention will now be described in detail with reference to the accompanying drawings.

FIGS. 1 to 5 show that a gimbal for 360-degree video and picture shooting according to one embodiment of includes a multi-axis driving unit mounted in a camera mounting unit so as to calibrate shaking of the camera mounting unit on which a plurality of cameras or lenses are mounted in 360° directions at regular intervals to take panoramic photography.

A gimbal 1 for 360-degree video and picture shooting according to the present invention includes a camera mounting unit 100 having a body 110 and a cavity 120 formed in a center of the body 110, with a plurality of cameras 2 being mounted on an outer peripheral surface of the body to take a 360-degree image or picture, a multi-axis driving unit 200 provided in the cavity 110 of the camera mounting unit 100 and fixed to one side of the camera mounting unit 100 to calibrate shaking of the camera mounting unit 100, and a support unit 300 to which the other side of the multi-axis driving unit 200 is fixed.

More specifically, the camera mounting unit 100 is formed with the cylindrical body 110, with top and bottom portions being opened or a portion being opened, and the cavity 120 formed in the center of the body 110. The body 110 is provided on an outer peripheral surface thereof with a plurality of fixing holes 132 at regular intervals, and the plurality of cameras 2 are mounted on the fixing holes 132 to take the 360-degree panoramic image or picture.

The fixing holes 132 are formed in fixing grooves 130 formed on the outer peripheral surface of the body 110, and the cameras 2 are brought into contact with the fixing grooves 130. The cameras 2 are integrally fixed to the fixing holes 132 by fastening members, such as screws, in the state in which the cameras 2 are brought into close contact with the fixing grooves 130.

The camera 2 includes a camera body capable of storing filmed images and pictures therein, as well as a camera module having a lens and an imaging device. If necessary, the camera module or the camera body can be selectively installed.

The fixing holes 132 can be formed on the outer peripheral surface of the body 110 in various patterns depending upon the number of cameras. For example, four fixing holes 132 are formed at an interval of 90 degrees; six fixing holes 132 are formed at an interval of 60 degrees; eight fixing holes 132 are formed at an interval of 45 degrees; and twelve fixing holes 132 are formed at an interval of 30 degrees.

The body 110 is formed in a cylindrical shape, as illustrated in the drawings, but may be formed in various shapes, such as a rectangle, a hexagon, or an octagon.

A coupling portion 140 is extended from one side of the body 110 toward the cavity 120, and is fixed to one side of the multi-axis driving unit 200.

The coupling portion 140 is extended from the body 110 to the center of the cavity 120, and a fixing member 141 protrudes integrally from the coupling portion 140 and is connected to one side of the multi-axis driving unit 200. The fixing member 141 may be engaged to one side of the multi-axis driving unit 200 by fastening members 145 and 146. For example, the fixing member 141 is formed with a male threaded portion, and the fastening members 145 and 146 are nut to be fastened to the fixing member 141.

The coupling portion 140 is formed on a top surface thereof with fixing holes 142 to which an auxiliary bracket 150 is detachably mounted, and the camera 2 is mounted to the auxiliary bracket 150. Accordingly, the camera 2 can be further installed on an upper or lower portion to take surrounding image or picture, as well as the outer peripheral surface of the body 110.

The body 110 of the camera mounting unit 100 is formed in the cylindrical shape, but may be formed in a hemispherical shape to form the cavity 120 therein. Also, a camera can be mounted on the upper portion of the body 110 to take an upward image and picture.

The multi-axis driving unit 200 is provided in the cavity 120 of the camera mounting unit 100 so that the multi-axis driving unit 200 is not filmed when the camera takes the image and picture. The multi-axis driving unit 200 calibrates the shaking of the camera mounting unit 100.

The multi-axis driving unit 200 may include a 3-axis or 2-axis motor structure.

FIGS. 1 to 7 show the 3-axis motor structure as one example of the multi-axis driving unit 200. The multi-axis driving unit 200 includes a Z-axis motor 210 fixed to one end of the support unit 300 in a Z-axis direction, a Z-axis bracket 220 with one end engaged to a rotary shaft 212 of the Z-axis motor 210 and the other end protruding in the Z-axis direction, an Y-axis motor 230 fixed to the other end of the Z-axis bracket 220 in an Y-axis direction, an Y-axis bracket 240 with one end engaged to a rotary shaft 232 of the Y-axis motor 230 and the other end protruding in the Y-axis direction, an X-axis motor 250 fixed to the other end of the Y-axis bracket 240 in an X-axis direction, and an X-axis bracket 260 with one end engaged to a rotary shaft 252 of the X-axis motor 250 and the other end protruding in the X-axis direction and integrally fixed to the camera mounting unit 100.

The Z-axis bracket 220 and the Y-axis bracket 240 are formed in an L-shape so as to be displaced when the Y-axis motor 230 and the X-axis motor 250 are installed. The X-axis bracket 260 is extended in a straight shape to be engaged to a front end of the rotary shaft 252, and has a fixing plate 261 engaged to the front end of the rotary shaft 252 and a coupling shaft 262 protruding from the fixing plate 261 and fixed to the fixing plate 261 by a fastening member, such as a screw.

The coupling shaft 262 of the X-axis bracket 260, to which the camera mounting unit 100 is integrally fixed, is formed with a slot 262a, and the fixing member 141 of the camera mounting unit 100 is inserted in the slot 262a. The fixing member 141 of the camera mounting unit 100 is inserted in the slot 262a formed in the coupling shaft 262 of the X-axis bracket 260, and the fastening members 145 and 146, such as nuts, are fastened to the fixing member 141, thereby integrally coupling the camera mounting unit 100 and the X-axis bracket 260.

The X-axis, Y-axis and Z-axis motors 250, 230 and 210 include a blushless DC (BLDC) motor, a DC motor, a step motor, a servo motor, and the like, and are provided with known X-axis, Y-axis and Z-axis circuit boards 254, 234 and 214 each having a gyro sensor and an encoder to calibrate the shaking of the camera mounting unit 100, thereby maintaining a position of the camera 2 in a horizontal direction.

In the X-axis, Y-axis and Z-axis circuit boards 254, 234 and 214, the gyro sensor is to measure an orientation, and the encoder is to detect rotation of the X-axis, Y-axis and Z-axis motors 250, 230 and 210. The gyro sensor and the encoder are provided to calibrate the shaking of the camera which is caused by operation of the X-axis, Y-axis and Z-axis motors 250, 230 and 210.

Of course, the X-axis, Y-axis and Z-axis circuit boards 254, 234 and 214 may be selectively provided with the encoder, since the gimbal can be achieved even though the X-axis, Y-axis and Z-axis circuit boards 254, 234 and 214 are not provided with the encoder.

The X-axis, Y-axis and Z-axis circuit boards 254, 234 and 214 are mounted on covers 255, 235 and 215 of the X-axis, Y-axis and Z-axis motors 250, 230 and 210.

In this instance, the multi-axis driving unit 200 may be provided with the X-axis, Y-axis and Z-axis motors 250, 230 and 210 which are disposed in a different order. For example, although it has been described that the Z-axis motor 210 is mounted on the support unit 300, the Z-axis motor 210 can be mounted on the camera mounting unit 100 if it can realize the basic function of the gimbal. Axial arrangement of the X-axis and Y-axis motors 250 and 230 can be changed. The present invention is not limited to the above-described arrangement of the X-axis, Y-axis and Z-axis motors 250, 230 and 210.

One end of the support unit 300 is fixed to the other side of the multi-axis driving unit 200, and the other end of the support unit 300 is formed with a separate flange, so that the support unit can be mounted to a mobile device, such as a helmet, a bicycle, a drone, a Segway, an RC car, a vehicle, and the like, by fastening members, such as screws.

It would be noted that the support unit 300 may be provided as a non-slip handle by forming a knurled portion on an outer peripheral surface or adhering a rubber pad on the outer peripheral surface, so that a user be able to take a picture while holding the camera with one hand and moving freely.

The support unit 300 is provided with a battery receiving portion 310, in which a battery 310 for supplying power is housed, and the Z-axis motor 210 is fixed to one end of the support unit 300. Also, the support unit 300 is provided with a control substrate 320 to control the whole system in response to the power supply to the battery 310. The control substrate 320 monitors the X-axis, Y-axis and Z-axis motors 250, 230 and 210 and the X-axis, Y-axis and Z-axis circuit boards 254, 234 and 214, and inputs or outputs a control signal.

In this instance, the control substrate 320 is equipped with a microcomputer built with a memory, or is equipped with a microprocessor and a memory. The support unit is preferably provided on one side thereof with an operation switch 301 to start or stop a process of horizontal calibration.

Figure 8:
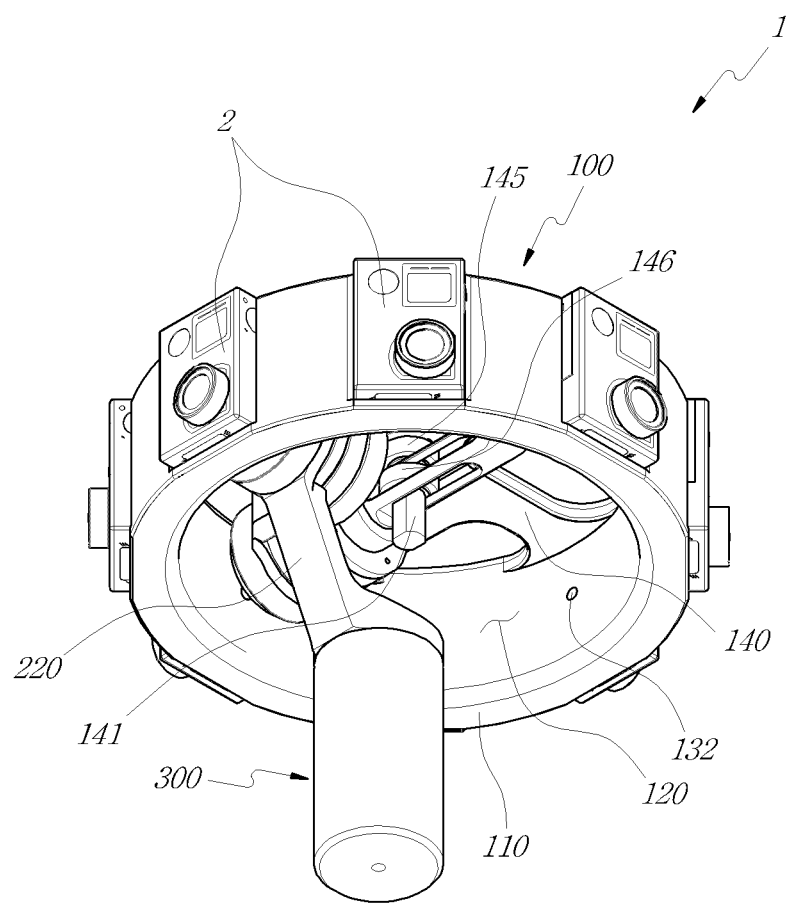
FIG. 8 is a perspective view illustrating a gimbal for 360-degree video and picture shooting according to another embodiment of the present invention.
Figure 9:
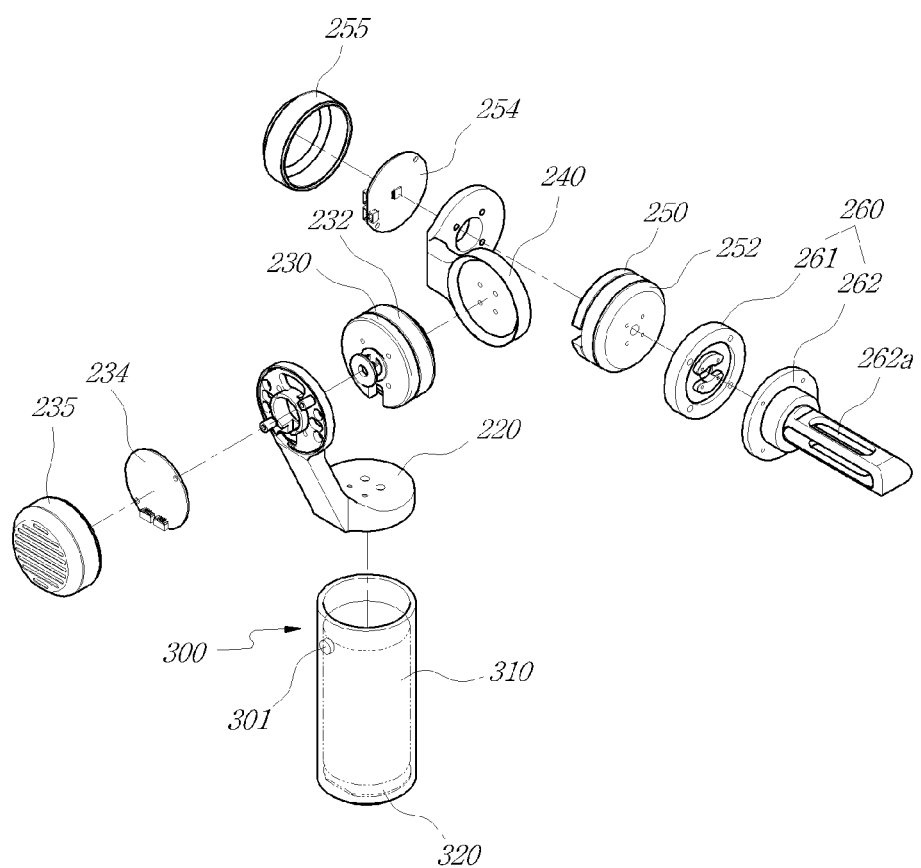
FIG. 9 is an exploded perspective view of the multi-axis driving unit in FIG. 8.

FIGS. 8 and 9 are views illustrating the 2-axis motor structure according to another example of the multi-axis driving unit 200.

The 2-axis motor structure is substantially identical to the multi-axis driving unit 200 of the 3-axis motor type, except that the Z-axis motor is not installed. Specifically, the multi-axis driving unit 200 includes a Z-axis bracket 220 protruding in the Z-axis direction to be fixed to one end of the support unit 300, an Y-axis motor 230 fixed to the other end of the Z-axis bracket 220 in an Y-axis direction, an Y-axis bracket 240 with one end engaged to a rotary shaft 232 of the Y-axis motor 230 and the other end protruding in the Y-axis direction, an X-axis motor 250 fixed to the other end of the Y-axis bracket 240 in an X-axis direction, and an X-axis bracket 260 with one end engaged to a rotary shaft 252 of the X-axis motor 250 and the other end protruding in the X-axis direction and integrally fixed to the camera mounting unit 100.

The multi-axis driving unit 200 can calibrate the shaking of the camera caused by the drive of the X-axis and Y-axis motors 250 and 230.

Hereinafter, the drive of the gimbal for 360-degree video and picture shooting according to the present invention will be described with reference to FIGS. 1 to 9.

The control substrate 320 is driven by turning on the operation switch 301 which is provided on the support unit 300 or is provided separately from the support unit 300, and the user takes the 360-degree image and picture by use of the camera 2 which is held by his hand, while the user is moving.

In this instance, the control substrate 320 analyzes a slope value inputted via the gyro sensor, and controls the drive of the X-axis, Y-axis and Z-axis motors 250, 230 and 210 so that the camera mounting unit 100 is leveled off.

The level maintenance is carried out by rotation of the Z-axis motor 210 around the Z-axis, rotation of the Y-axis motor 230 around the Y-axis, and rotation of the X-axis motor 250 around the X-axis.

When the level of the X-axis, Y-axis and Z-axis motors 250, 230 and 210 is leveled off, the encoder can detect the amount of rotation, revolutions and a rotation direction of the X-axis, Y-axis and Z-axis motors 250, 230 and 210. The control substrate 320 controls the X-axis, Y-axis and Z-axis motors 250, 230 and 210 more precisely by use of feedback information, thereby maintaining the level of the camera mounting unit 100 and thus calibrating the shaking of the camera.

Even in the case where the multi-axis driving unit 200 employs the 2-axis motor structure, the multi-axis driving unit 200 is controlled by the above-described method.

Since the multi-axis driving unit 200 is not exposed to the outside when the gimbal 1 according to the present invention takes the 360-degree image and picture, it is possible to minimize the restriction of the area to be filmed when taking the surrounding image and picture.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A gimbal for 360-dgree video and picture shooting, comprising:
   a camera mounting unit having a body and a cavity formed in a center of the body, with a plurality of cameras being mounted on an outer peripheral surface of the body to take a panoramic 360-degree image or picture;
   a multi-axis driving unit provided in the cavity of the camera mounting unit and fixed to one side of the camera mounting unit to calibrate shaking of the camera mounting unit; and
   a support unit to which one side of the multi-axis driving unit is fixed,
   wherein the body of the camera mounting unit is formed in a cylindrical or polygonal shape, with top and bottom portions being opened or a portion being opened, and is provided on the outer peripheral surface thereof with a plurality of fixing grooves at regular intervals, with which the plurality of cameras are brought into close contact to take the 360-degree panoramic image or picture, and a plurality of fixing holes are formed in the fixing grooves to mount the plurality of cameras;
   wherein a coupling portion is extended from one side of the body to the cavity, and a fixing member protrudes integrally from the coupling portion and is connected to another side of the multi-axis driving unit;
   wherein:
   the coupling portion is formed on a top surface thereof with a fixing hole to which an auxiliary bracket is detachably mounted, and a camera is mounted to the auxiliary bracket;
   the multi-axis driving unit includes a Z-axis motor fixed to one end of the support unit in a Z-axis direction, a Z-axis bracket with one end engaged to a first rotary shaft of the Z-axis motor and another end protruding in the Z-axis direction, an Y-axis motor fixed to another end of the Z-axis bracket in an Y-axis direction, an Y-axis bracket with one end engaged to a second rotary shaft of the Y-axis motor and another end protruding in the Y-axis direction, an X-axis motor fixed to another end of the Y-axis bracket in an X-axis direction, and an X-axis bracket with one end engaged to a third rotary shaft of the X-axis motor and another end protruding in the X-axis direction and integrally fixed to the camera mounting unit;
   the X-axis bracket has a fixing plate engaged to a front end of the third rotary shaft and a coupling shaft protruding from a front portion of the fixing plate and formed with a slot, through which the fixing member of the camera mounting unit is inserted;
   the fixing member is inserted in the slot, and a fastening member is fastened to the fixing member; and
   the support unit is provided with a battery to supply a power, and a control substrate to control the X-axis, Y-axis and Z-axis motors.

* * * * *